Oct. 21, 1952         B. ESSICK         2,614,884
PORTABLE SPRAYING EQUIPMENT
Filed Feb. 14, 1949         4 Sheets-Sheet 1
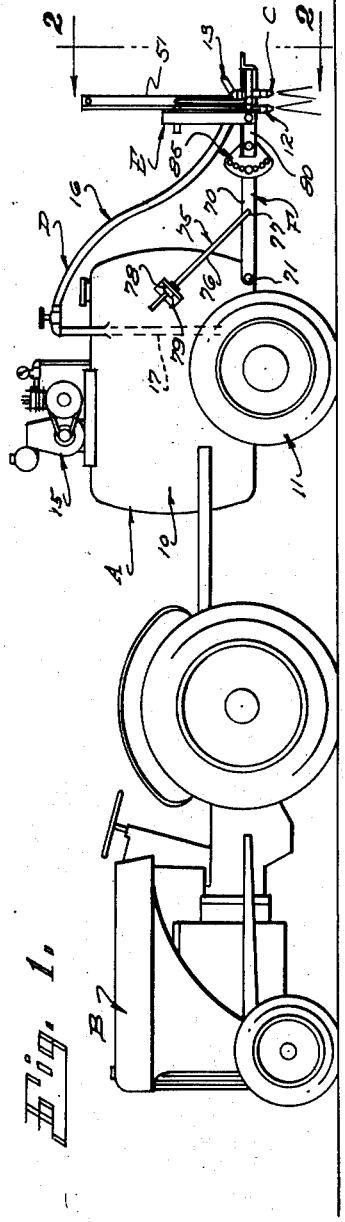
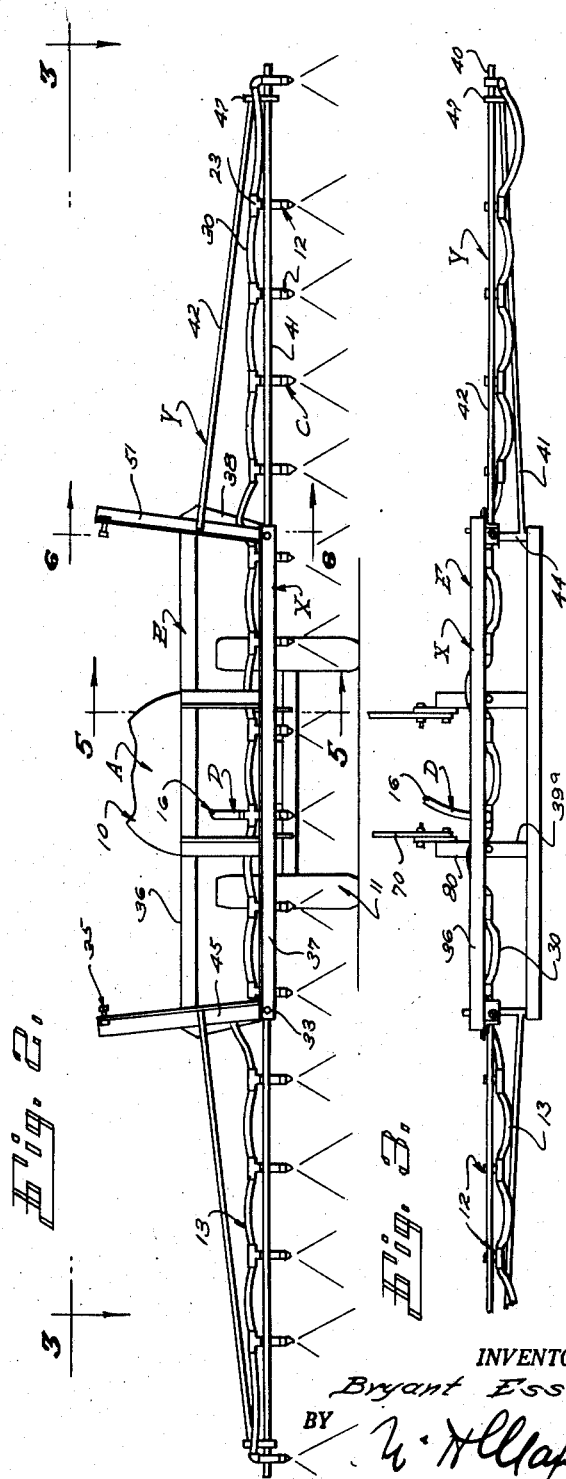
INVENTOR.
Bryant Essick
BY
Attorney

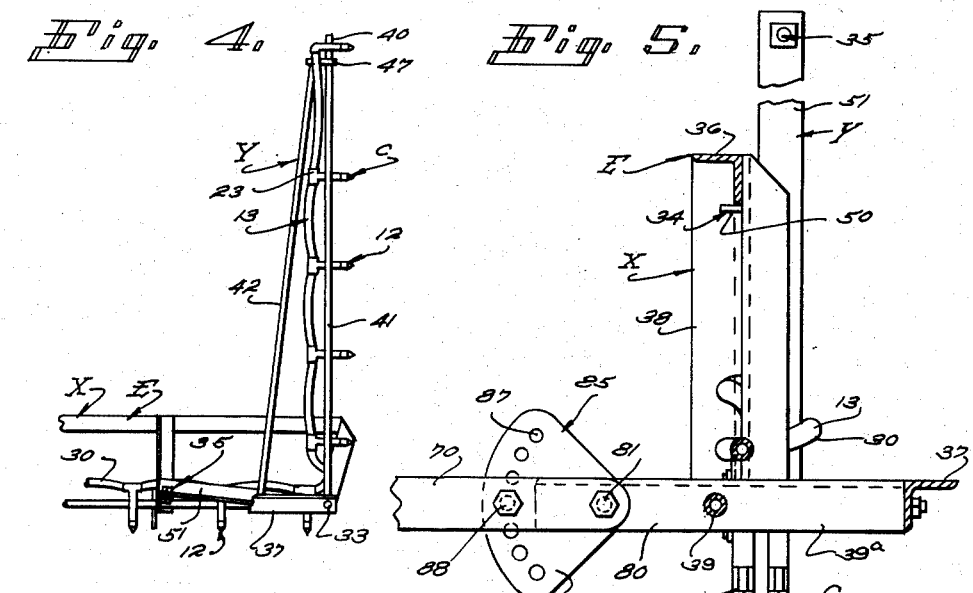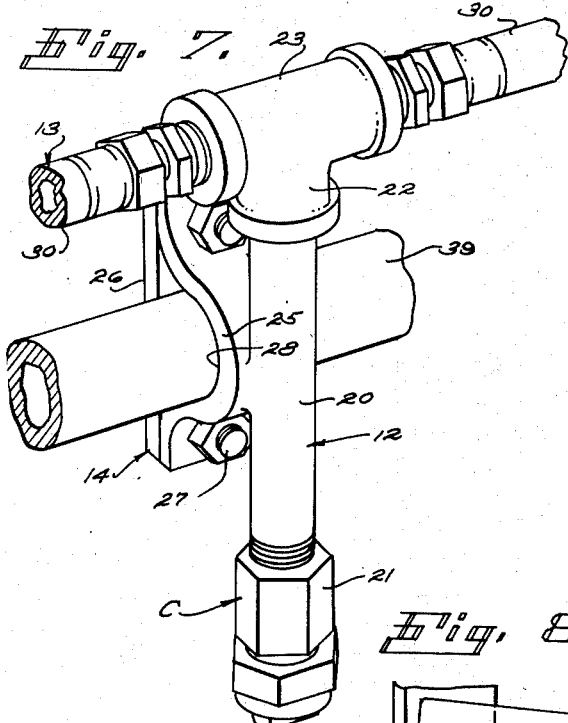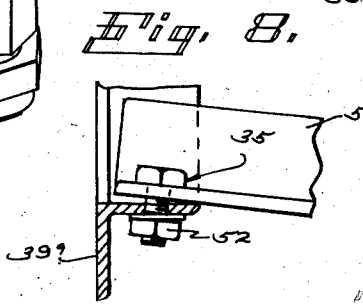

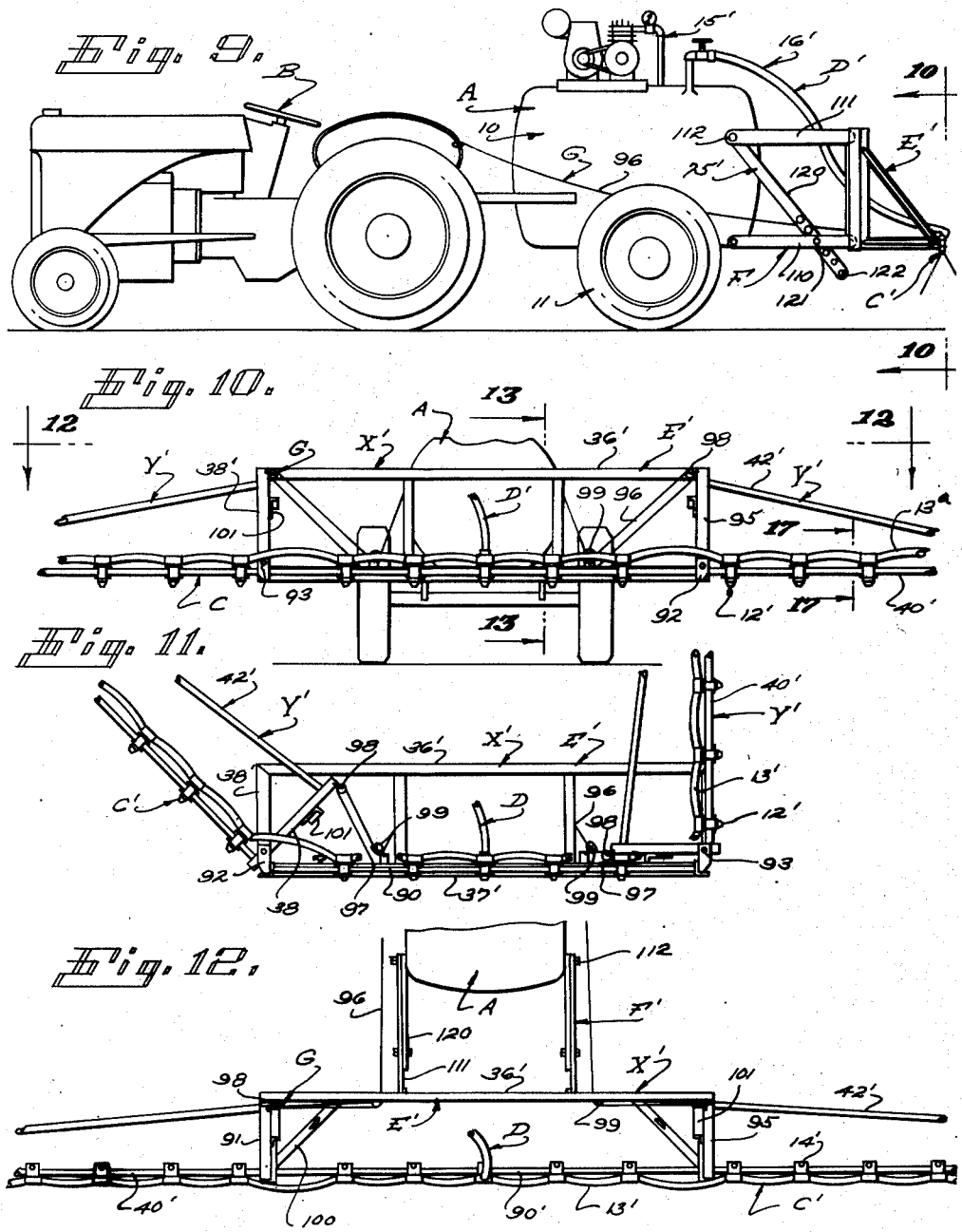

Oct. 21, 1952    B. ESSICK    2,614,884
PORTABLE SPRAYING EQUIPMENT
Filed Feb. 14, 1949    4 Sheets-Sheet 4
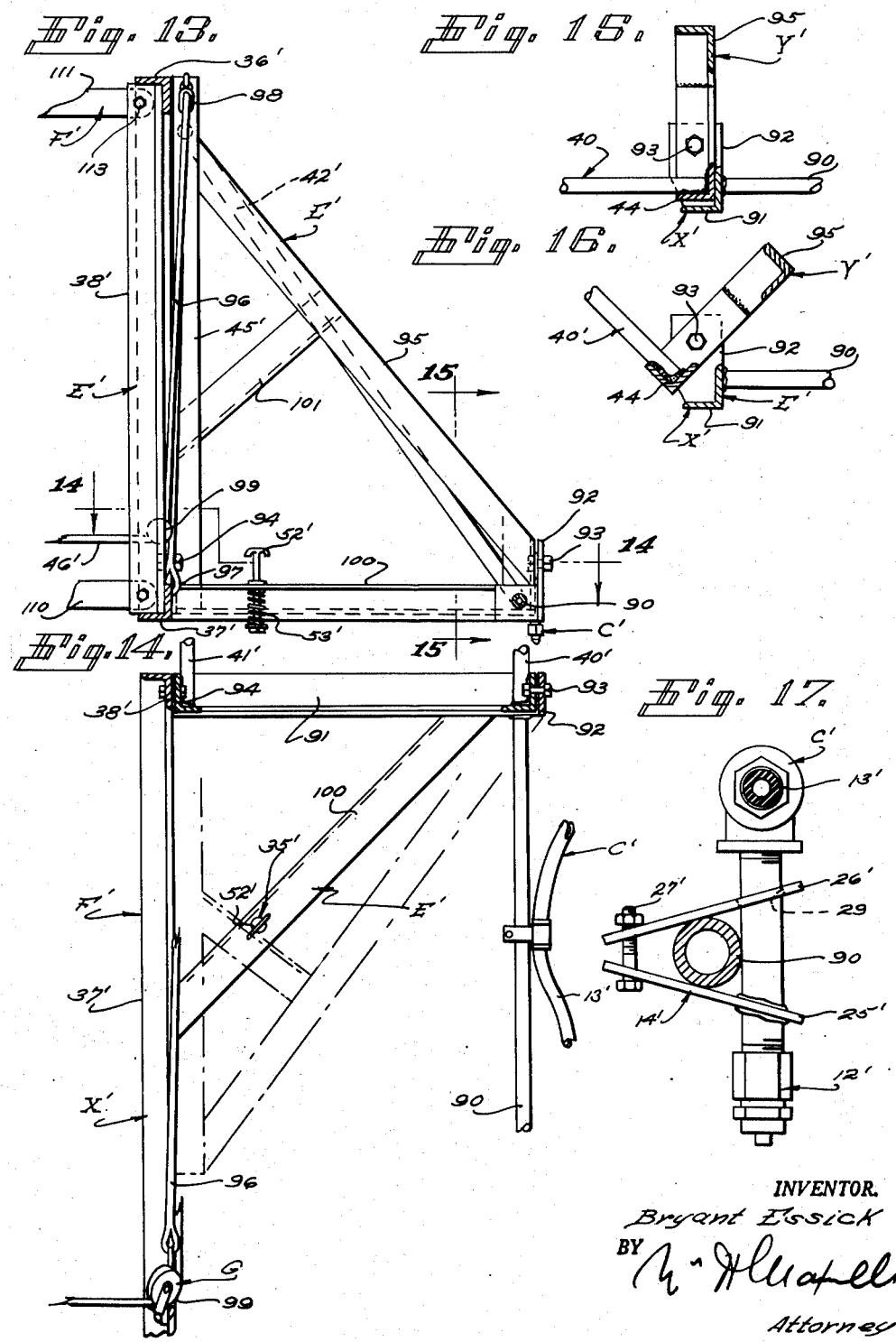
INVENTOR.
Bryant Essick
BY
Attorney Patented Oct. 21, 1952

2,614,884

UNITED STATES PATENT OFFICE 2,614,884

PORTABLE SPRAYING EQUIPMENT

Bryant Essick, Los Angeles, Calif., assignor to Essick Manufacturing Company, Los Angeles, Calif., a corporation of California Application February 14, 1949, Serial No. 76,297

5 Claims. (Cl. 299—40)

This invention has to do with portable or mobile spraying equipment and it is a general object of the invention to provide spraying apparatus of simple, practical form having a wide spread or covering capacity and collapsible to render it operable through spaces or openings suitable for passing ordinary vehicles.

It is desirable in the spraying of crops or vegetation, generally, to provide spraying apparatus to be drawn by a tractor or the like, and which has a very wide spread, that is, which is considerably wider than the tractor in order to cover a wide path in the course of operation. Various devices have been proposed or provided for this class of use and certain adjustments have been incorporated in such devices to vary their width or extent. Generally speaking, spraying apparatus effective to cover a wide path is bulky, cumbersome, and difficult to manage, and is not conveniently and readily operable through restricted openings or passages, such as gates, narrow roads, etc.

It is a general object of this invention to provide spraying apparatus which, when in operation, extends a substantial distance from either side of the draft vehicle and thus covers a very large path and which is such that it can be easily and quickly collapsed or operated to a folded or contracted position where it is no wider than an ordinary vehicle, and consequently, can be passed through an ordinary gate opening, along an ordinary road, etc.

It is another object of this invention to provide spraying equipment of the general character referred to involving a frame carrying spray heads, which frame is of simple practical dependable construction, involves few simple parts, and can be easily and quickly operated between an extended position where it is of substantial length and a collapsed or folded position where it is of limited length.

It is another object of this invention to provide spraying equipment of the general character referred to including a simple practical and highly effective mounting for supporting a frame or a carrier such as a mobile tank, or the like. The present invention provides a mounting which supports a frame provided to carry spray heads, which mounting provides for a general vertical adjustment of the frame through a wide range, and further, provides a means for trimming or leveling the frame so that it can be maintained in a most advantageous position, or in any desired position, about a horizontal axis transverse of the equipment when adjusted to any vertical position.

It is another object of this invention to provide spraying equipment of the general character referred to including a mounting for supporting a frame and a simple, practical and highly effective means for trimming or leveling the frame so that the frame remains horizontally disposed as the mounting means is operated vertically.

It is a further object of the present invention to provide spraying equipment of the general character referred to including a frame, and a spray distributor carried by the frame having spray heads in connection therewith such that there is free movement of the frame and free adjustment of the spray heads along the frame to gain any desired lateral adjustment of the heads.

It is a further object of the present invention to provide spraying equipment of the general character referred to involving a construction in which there is a shiftable nozzle carrying frame and simple, practical, and highly effective means for operating the frame from a point remote therefrom.

The various objects and features of my invention will be fully understood from the following detailed description of typical preferred forms and applications of the invention, throughout which description reference is made to the accompanying drawings, in which:

Fig. 1 is a side elevation of a typical embodiment of the present invention showing the structure of the present invention combined with or applied to a carrier in the form of a wheel-supported tank, and showing the carrier drawn by a typical draft vehicle. Fig. 2 is a rear view of the structure shown in Fig. 1, being a view taken as indicated by line 2—2 on Fig. 1. Fig. 3 is a plan view of the parts shown in Fig. 2, being a view taken as indicated by line 3—3 on Fig. 2. Fig. 4 is a view of a portion of the structure shown in Fig. 2 showing the parts in a collapsed or folded position. Fig. 5 is an enlarged detailed sectional view taken as indicated by line 5—5 on Fig. 2. Fig. 6 is an enlarged detailed sectional view taken as indicated by line 6—6 on Fig. 2. Fig. 7 is a perspective view of one of the spray heads included in the apparatus showing it applied to a holder included in the frame which supports the spray heads. Fig. 8 is an enlarged detailed sectional view showing the means provided to fasten an end section of the frame in the folded or elevated position. Fig. 9 is a view similar to Fig. 1 illustrating a different embodiment of the invention. Fig. 10 is a rear view of the structure shown in Fig. 9 being a view taken as indicated by line 10—10 on Fig. 9. Fig. 11 is a view of a portion of the structure shown in Fig. 10 showing parts at one end in a collapsed or folded position and parts at the other end in a partially collapsed or folded position. Fig. 12 is a plan view of the parts shown in Fig. 10 being a view taken as indicated by line 12—12 on Fig. 10. Fig. 13 is an enlarged detailed sectional view taken as indicated by line 13—13 on Fig. 10. Fig. 14 is a sectional plan view taken as indicated by line 14—14 on Fig. 13. Fig. 15 is a sectional view taken as indicated by line 15—15 on Fig. 13. Fig. 16 is a view similar to Fig. 15 showing the parts operated to a different position, and Fig. 17 is an enlarged view of one of the spray heads being a sectional view taken as indicated by line 17—17 on Fig. 10.

The present invention provides or involves features of construction applicable to sprayers, generally, and the invention is intended to be carried out in apparatus handling various liquid sprays, powders, or other like materials. Further, the invention contemplates the provision of apparatus of widely different capacity, that is, it may be incorporated in small machines of limited capacity or in very large machines intended to cover very wide paths in the course of operation. The particular forms of the invention illustrated in the drawings are intended for handling a liquid spray and the constructions set forth are that which have been found to be commercially practical for general use.

In the drawings I have illustrated a movable carrier A involving essentially a liquid carrying tank 10 carried by a pair of wheels 11. The carrier A is shown coupled to a suitable draft vehicle B in the nature of a tractor.

The form of the invention illustrated in Figs. 1 to 8 of the drawings provides, generally, a spray distributor C, spray supply means D, a frame E carrying the distributor C and mounting means F supporting the frame C from the carrier A.

The spray distributor C in the form illustrated in the drawings involves a plurality of heads 12 from which the spray is delivered, a manifold 13 handling spray for the heads 12 and brackets 14 by which the heads are applied to or mounted on holders provided in or as a part of the frame.

The supply means D may vary widely in form and construction and will obviously vary with the particular type or class of spray material being handled. In the particular case illustrated the means D is shown as involving, generally, a pumping unit 15 handling spray received from the tank 10 of carrier A and a supply line 16 conducting the spray to the manifold 13. In the particular case illustrated the pumping unit 15 involves a motor driven pump supplying air under pressure to the closed tank 10 and the supply line 16 is connected to a siphon tube 17 extending into the tank to the lower portion thereof.

The frame E, in accordance with the broader principles of the present invention, involves shiftable or relatively movable sections provided to establish a collapsible or folding structure which, when in operating position or extended, is of considerable length, and which collapses of folds into a structure occupying a rather small or limited space. In the present invention as illustrated throughout the drawings the frame involves pivotally connected section. In the form of the invention being described it is shown as involving a main or center section X and two outer or end sections Y.

The mounting means F supporting the frame E from the carrier A preferably connects the frame with the tank 10 and is operable so that the frame can be adjusted or shifted to various positions vertically above the ground over which the apparatus operates. The spray distributor C is characterized by a plurality or series of heads 12 and the manifold 13 so couples the heads as to enable them to be arranged in various spaced relationships lengthwise of the frame. Ordinarily, the several heads will be spaced apart along the frame to form a series of heads extending the entire length of the frame as shown throughout the drawings. However, it will be apparent that conditions such as the manner in which vegetation is planted in rows may require adjustment or spacing of the heads in a manner other than that illustrated.

Each head 12 involves an elongate tubular body 20 and a spray nozzle 21 on one end of the body. In the case illustrated the other end of the body is connected to a lateral branch or outlet 22 of a fitting 23 which is a part of the manifold 13. It will be understood, of course, that the body of the head may vary widely in form and construction, as circumstances may require, and that the nozzle 21 may be of any suitable form or type serving to deliver spray in the desired manner.

The bracket 14 provided in connection with each spray head preferably involves a saddle 25 fixed to one side of the body 20 of the head, a clamp plate 26 and clamp bolts 27 connecting the plate to the saddle. The parts just described are shaped and proportioned to suitably cooperate with the frame part to which the bracket connects. Where the frame part is a holder round in cross section, as shown in Fig. 7 of the drawings, the saddle 25 is provided with a rounded seat 28 and is shaped to embrace the holder, while the clamp plate 26 may be a flat plate closing the saddle and having its ends clamped to the ends of the saddle by the bolts 27. Through this construction each head can be adjusted along the holder of the frame to the desired position, and if necessary, may be rotated on the holder to any desired rotative position thereon.

The manifold 13 of the spray distributor involves, generally, the fittings 23 to which the bodies of the heads 12 are connected, and flexible couplings 30, which join or extend between adjacent fittings 23. In practice the couplings 30 are flexible and may be formed of suitable lengths of hose, or the like, the ends of which are suitably connected to the fittings 23, as clearly shown in Fig. 7 of the drawings.

The frame E of the present invention, supported by the means F, normally extends horizontally with its several sections aligned or arranged end to end as shown in Figs. 2 and 3 of the drawings. Where the frame involves a main or center section X and two end sections Y, it is preferred that the end sections Y be pivotally connected to the ends of the center section X, as by suitable pivot pins 33 and that the structure include stop means 34 serving to limit downward pivotal movement of the end sections Y so that they stop in horizontal alignment with the center section when in their lowermost positions. Further, fastening means 35 are provided serving to releasably fasten or hold the end sections Y in a folded or up position, such as is shown in Fig. 4 of the drawings.

The main or center section X of the frame E is an elongate rigid structure supported by the means F so that it is maintained in a horizontal position extending transversely of the structure. In the form illustrated the main section X of the frame includes, generally, an upper longitudinal beam 36, a lower longitudinal front beam 37, end posts 38 that extend vertically or substantially vertically at the ends of the frame section, and a head holder 39. The posts are shown extending between the upper beam 36 and the head holder 39 so that these elements are connected together at each end of the frame section X. The lower beam 37 is shown located forward of and parallel with the holder 39 and is coupled with the holder 39 at spaced points intermediate the ends of the frame section by spreaders 39ª. The pivot pins 33 which support the end sections of the frame extend between the ends of the holder 39 and the ends of the front beam 37 to which parts they are rigidly connected, and thus, in effect, stiffen and become parts of the frame section.

The outer or end sections Y of the frame are preferably alike and each is shown as including a longitudinal head holder 40, a lower forward beam 41 and an upper beam 42. Each end section of the frame further includes a spreader 44 between the inner ends of the holder 40 and forward beam 41, and a standard 45 which projects upward from the spreader 44 and connects with the upper beam 42. The holder 40 and the beams 41 and 42 converge from the end of the frame section joined with the center section X to be joined at the outer or free end of section Y by a suitable bracket 47.

Each end section is provided with stop means 34 serving to stop it in a horizontal position upon being lowered therethrough from an upright position such as is shown in Fig. 4. The stop means involves a stop lug 50 projecting from the upwardly projecting standard at the inner or pivoted end of frame section Y, which lug is so arranged and disposed as to bear outwardly against the inner edge or side of the post 38 of frame section X occurring at the end of the frame section X to which the frame section Y is pivoted. It will be apparent from the drawings that gravity serves to normally tend to swing or turn the end frame section Y downwardly so that the stop lug 50 remains in engagement with the post 38 until the section Y is deliberately swung or lifted upwardly as to a position such as is shown in Fig. 4.

Each end section Y of the frame is provided with a fastener 35 engageable to hold it in an up or elevated position, as shown in Fig. 4. The fastener illustrated involves an extension 51 of the standard projecting at the inner end of the frame section Y to a point where it adjoins a stationary element of the frame E when the parts are positioned, as shown in Fig. 4. In the arrangement illustrated the extension 51 is such as to adjoin or overlie a spreader 39 of frame section X when the end section of the frame is up. The fastener further includes a fastening device, preferably a releasable fastener, such as a bolt 52, by which the extension 51 may be releasably joined to the spreader 39 in a manner such as is shown in Figs. 4 and 8 of the drawings.

The mounting means F supporting the frame E from the carrier A preferably couples the frame to the tank of the carrier, and in the preferred form of the invention the means F involves one or more main mounting arms. In the form of the invention illustrated in Figs. 1 to 8 of the drawings I employ a pair of main mounting arms 70, and the means F includes pivots 71 pivotally connecting the inner ends of the arms to the lower rear portion of tank 10 on a common horizontal transverse axis. The arms 70 support the frame E, as will be hereinafter described, and being pivoted to the tank 10 they support the frame so that it can be moved to various positions vertically.

The means F includes in addition to the arms 70 adjustable fastening means 75 in connection with the arms 70 whereby the arms may be secured or set in the desired angular position about the pivotal supports 71. In the form of the invention under consideration there is a unit of means 75 in connection with each arm and each unit of the means 75 includes an adjusting rod 76 pivotally connected to the arm 70 at 77. The rod 76 extends through a bracket 78 fixed on the side of the tank 10 and adjusting nuts 79 are threaded on the rod 76 at either side of the bracket. By adjusting the positions of the nuts 79 along the rod 76 the position of arm 70 can be varied at will.

The arms 70 of means F may be joined or coupled to the frame in any suitable manner, it being preferred that connection between the arms 70 and the frame be confined to one or more suitable connections between the arms and the center section of the frame. The spreaders 39 of the center section of the frame are located to occur opposite the arms 70 and the spreaders have bracket-like extension 80 projecting from the frame and toward the arms 70, which brackets are pivotally connected to the outer or terminal ends of the arms 70 by suitable pivot members 81. Through this connection the frame is pivotally connected to the arms 70 and consequently can be rotated or adjusted to various positions while being maintained horizontally a suitable distance above the ground.

The means F includes adjustable fasteners 85 for securing the brackets 80 in the desired rotative positions relative to the arms 70. In the form of the invention illustrated each bracket 80 has a segmental enlargement or head 86 projecting from the point where the bracket is joined to the arm 70. The brackets 86 have arcuate series of openings 87 in them concentric with the pivot connections 81 and releasable fastening devices or bolts 88 extend through the arms 70 and through selected holes or openings 87 to secure the brackets 80 against pivotal movement relative to the arms 70 following positioning of the frame in the desired manner relative to the arms 70.

Ordinarily the arms 70 provide a general vertical adjustment for the frame E while the structure just described, namely the brackets 80, pivots 81 and means 85, provide for trimming or secondary adjustment of the frame so that it may be maintained in a suitable tilted position or in a perpendicular position, as circumstances may require. Ordinarily it is desirable to maintain the frame in what I term a perpendicular position, that is, with parts such as the posts 37 and standards 45 extending vertically so that the end sections of the frame swing up to truly vertical positions upon being folded, as shown in Fig. 4 of the drawings.

From the foregoing description it will be apparent that the center section of the frame E may be so constructed as to correspond, generally, in width with an ordinary vehicle so that the entire structure may be passed through an ordinary opening, such as gate or doorway, suitable for passing vehicle, by merely swinging the end sections of the frame from the extended working position shown in Figs. 2 and 3 to the up or folded position shown in Fig. 4. The stop means 34 permit immediate movement of the end sections Y from the extended or working position, the means 35 are simple and effective and when the bolts 52 are engaged the end sections are securely maintained in the up position. It will be apparent how the heads of the spray distributor may be spaced so they will serve to advantageously distribute spray, and it will be apparent that the flexible conductors or elements 30 of the manifold 13, occurring where the sections of the frame are pivotally connected, allow for free pivotal movement of the end sections of the frame relative to the center section. Furthermore, it will be apparent how the supply line 16 of means D may couple to the manifold 13 at any suitable point so that the means D delivers the desired spray material to the manifold for distribution to the several heads 12.

The form of the invention illustrated in Figs. 9 to 17 of the drawings provides, generally, the same broad or general elements or means as set forth with reference to the form of the invention above described. I will therefore more briefly describe the second form of the invention in light of the description applied to the first form.

The second form of the invention provides, generally, in addition to the carrier A and draft vehicle B, a spray distributor C', spray supply means D', a frame E' mounting means F', and an operating or lifting means G.

The spray distributor C' is essentially the same as the distributor C first described and involves a plurality of heads 12', a manifold 13', and brackets 14'. In this form of the invention the brackets 14' provided in connection with each spray head involves a pair of plates 25' and 26'. Plate 25' is a fixed plate extending laterally from the body 20' of the head, and may be secured to the body of the head as by welding. It is preferred that the plate be pitched to extend somewhat axially of the body, as well as laterally, as shown in Fig. 17.

Plate 26' is a movable plate extending laterally from the body 20' and is adjustable lengthwise of the body. Plate 26' is carried on the body above the plate 25' so that the spray head can be applied to a holder, such as an elongate tubular member, so that the holder is straddled or embraced by the two plates. In practice the plate 26' is provided with an opening 29 somewhat larger than the body 20' and when pressure is applied to the outer end of the plate urging it toward plate 25' a positive gripping action is established fixing the position of the plate lengthwise of the body 20'.

A clamp bolt 27' connects the outer end portions of the plates 25' and 26' and is operable to urge them toward each other establishing the desired clamping pressure on the holder with the head in the desired position around and lengthwise thereof.

The supply means D' is essentially the same as the means D first described and handles spray material received from tank 10 of the carrier A to deliver it to the manifold 13' of the distributor C'. The means D' involves a pumping unit 15' and a supply line 16', all as above described.

The frame E' involves a main or center X' and two outer sections Y' pivotally connected to the ends of the center section. Section X' includes an upper beam 36', a lower beam 37', end posts 38', and a head holder 90. In this form of the invention the beam 37' is situated forward of the holder 90 to occur below the beam 36', and the holder is spaced rearward of the beams 37' by spreaders 91 at the ends of the frame section X'.

Each outer section Y' includes, a head holder 40', a lower beam 41', and an upper beam 42'. In this form of the invention the holder 40' is at the forward side of the structure while the beam 41' is at the rear thereof. The parts 40', 41' and 42' converge throughout the length of the section and toward the outer or tip end thereof. At the inner end of each section Y' there is a spreader 44' spacing the beam 41' and the holder, and there is a standard 45' which projects upwardly to connect with the beam 42'.

As shown in Figs. 15 and 16 of the drawings spreaders 44' and 91 cooperate to form a stop. The spreader 44' abutts or seats against the spreader 91 and the axis of the pivotal connection between the frame sections is a substantial distance above the spreaders. A standard 92 projects upwardly from the rear end of spreader 91 and carries a pivot 93 which forms the pivotal connection between the sections at the rear of the structure. A pivot 94 coaxial with pivot 93 forms the pivoted connection between the sections at the front of the structure. Pivot 94 is carried by the standard 45' and engages the forward side of the section Y'. A brace member 95 is provided at the inner end of the section Y' between upper beams 42' and the holder 40'.

When the outer sections are down or extended the parts 44' and 91 abutt providing a stop to hold the outer sections in true alignment with the center section.

The form of the invention illustrated in Figs. 9 to 17 of the drawing includes lifting or operating means G for the outer sections of the frame. The means G in its preferred form involves generally flexible lines 96 extending from the outer sections of the frame to the vehicle B to be manipulated by the operator thereof. A line 96 is secured to each outer frame section at 97 and passes over a pulley 98 supported at the upper end portion of a standard 38'. Line 96 is shown passing over a second pulley 99 suitably located on the frame E' from which it extends to the vehicle B. By suitable handling of lines 96 the operator may control the positions of the frame extensions Y' from the driver's seat of the vehicle B.

Each frame section Y' is provided with a fastener 35' engageable to releasably hold it in an up or elevated position. A brace 100 is provided at each end of frame section X' and extends diagonally from the rear end of spreader 91 to the beam 36'. The fastener 35' is shown carried by the brace 100 to occur near the upper or head end portion of standard 45'. The fastener involves a hook 52' secured to the brace through a spring 53'. A suitable fastening bar 101 is carried at the head of the standard 45' to cooperate with the hook 52'. When the section Y' is elevated to the position shown at the right in Fig. 11, the fastener 35' is engageable with the bar 101 by lifting the hook 52' over the bar. The spring 53' urges the hook into tight engagement with the bar so that the standard 45' is held down tight against the brace 100, as indicated by the broken lines in Fig. 14 of the drawings.

The mounting means F' illustrated in Figs. 9 to 17 of the drawings mounts the frame for vertical adjustment and acts to turn or level the frame E' so that the frame remains horizontally disposed as it is bodily adjusted vertically. The means F' involves, generally, one or more main arms 110 and one or more stabilizing arms 111. In the case illustrated the arms 111 are arranged or located above the main arms 110. The arms 110 and 111 are parallel, are of equal length and are preferably spaced a substantial distance apart vertically. In the preferred form of the invention the arms 110 and 111 are pivotally connected at their inner ends to the rear of the tank 10 of the carrier A, and at their outer ends to the frame E'. The pivotal connections 112 at the tank are in spaced vertical alignment, while the pivotal connections 113 at the frame E' are in like or corresponding spaced vertical alignment. Since the connections 112 at the tank are fixed and in vertical alignment the connections 113 at the frame remain in vertical alignment regardless of the position to which the frame may be adjusted vertically.

The invention provides adjustable fastening means 75' in connection with the arms 110 and 111 whereby the arms may be supported in any desired position. In the drawings the means 75' is shown as involving one or more adjusting bars 120 pivotally secured to the upper rear end portion of the tank 10. Each bar has an elongate series of openings 122 to be selectively employed to register with an opening in the lower or main arm 110. A pin 121 or the like, is engaged in the registering openings to secure the structure in the desired position.

The invention has been described as being employed for spraying vegetation over which the frame is operated, that is, it has been implied that the structure is to be used for spraying close to the ground. It is to be understood that the invention is not to be construed as limited to this particular use, since it may be varied widely in use or application. For example, if tall or upstanding vegetation, such as trees are to be sprayed such action can be gained by operating the apparatus with the end sections or with an end section of the frame projecting upwardly in the desired manner, as for instance, vertically, as shown in Fig. 4. In such case the spray heads of the spray distributor will, of course, be suitably arranged and distributed and may even be confined solely to the end sections of the frame, or to the parts thereof, all as circumstances may require.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. In combination, a carrier having wheels engaging the ground, spray distributing means including a plurality of nozzles, a frame carrying said means with the nozzles facing in a predetermined direction relative to the ground, and a mounting supporting the frame from the carrier for vertical adjustment relative thereto and including arms pivoted to the carrier and to the frame and means maintaining the frame with the nozzles facing in said predetermined direction relative to the ground during vertical movement of the frame, the frame carrying end sections mounted on axes maintained horizontally and about which the end sections are shiftable between horizontal and vertical positions through the entire range of vertical adjustment of the frame.

2. In combination, a wheel supported carrier, spray distributing means including spray nozzles, a frame carrying said means and having a rigid center section and end sections, and a mounting supporting the frame from the carrier for vertical adjustment relative thereto and including vertically spaced pairs of arms pivoted to the carrier and to the center section of the frame, a holder adjustably securing the arms in a predetermined position relative to the carrier, the end sections of the frame being carried by and pivoted to the center section on horizontal axes disposed lengthwise of the carrier and about which the end sections are shiftable between horizontal and vertical positions.

3. In combination, a carrier having ground engaging wheels, spray distributing means including a plurality of nozzles, a frame carrying said means with the nozzles facing in a predetermined direction relative to the ground, and vertically spaced pairs of arms each pivoted at their opposite ends to the carrier and to the frame, said arms supporting the frame from the carrier for vertical adjustment relative thereto with the nozzles maintained in said direction relative to the ground, the frame including a center section horizontally disposed transversely of the carrier and engaged by said arms, elongate end sections having inner ends pivotally connected to the ends of the center section on horizontal axes extending lengthwise of the carrier, and stop means stopping pivotal movement of the end sections relative to the center section including, projections rigid with the end sections and projecting laterally therefrom at the inner ends thereof and spaced stop parts on the center section engaged by said projections.

4. In combination, a carrier having ground engaging wheels, spray distributing means including a plurality of nozzles, a frame carrying said means with the nozzles facing in a predetermined direction relative to the ground, and vertically spaced pairs of arms each pivoted at their opposite ends to the carrier and to the frame, said arms supporting the frame from the carrier for vertical adjustment relative thereto with the nozzles maintained in said direction relative to the ground, the frame including a center section horizontally disposed transversely of the carrier and engaged by said arms, elongate end sections having their inner ends pivotally connected to the ends of the center section on horizontal axes extending longitudinally of the carrier, and means releasably holding the end sections angularly related to the center section including, projections rigid with the end sections and projecting laterally therefrom at the inner ends thereof, spaced stop parts on the center section engaged by said projections, and releasable fastening means securing the projections to the stop parts.

5. In combination, a carrier having ground engaging wheels, spray distributing means including a plurality of spray nozzles, a frame carrying said means with the nozzles facing in a predetermined direction relative to the ground, vertically spaced pairs of arms supporting the frame from the carrier for vertical adjustment relative thereto, the frame including a horizontally disposed elongate center section engaged by said arms, elongate end sections having their inner ends pivotally connected to the ends of the center section on horizontal axes, stop means supporting the end sections in an up position where they are vertically disposed and a down position where they are in alignment with the center section, and fastening means engageable to releasably hold the end sections in said positions relative to the center section, the stop means including projections at the inner ends of the arms projecting laterally therefrom, stops on the center section engaged by said projections, and braces between the projections and the outer end portions of the end sections.

BRYANT ESSICK.

REFERENCES CITED

The following references are of record in the file of this patent:

UNITED STATES PATENTS

| Number | Name | Date |
|---|---|---|
| 931,030 | Bowman | Aug. 17, 1909 |
| 1,118,091 | Willis et al. | Nov. 24, 1914 |
| 1,886,369 | Bogart | Nov. 8, 1932 |
| 1,887,092 | Glase | Nov. 8, 1932 |
| 2,169,948 | Gallupe | Aug. 15, 1939 |
| 2,211,759 | Pitner | Aug. 20, 1940 |
| 2,273,344 | Black et al. | Feb. 17, 1942 |
| 2,301,213 | Kang | Nov. 10, 1942 |
| 2,305,913 | Troyer | Dec. 22, 1942 |

FOREIGN PATENTS

| Number | Country | Date |
|---|---|---|
| 453,326 | France | Apr. 1, 1913 |
| 615,764 | France | Oct. 18, 1926 |